Nov. 28, 1961   J. N. EDWARDS   3,011,071
ELECTRO-MECHANICAL DIFFERENTIAL-VOLTAGE DETECTOR
Filed July 1, 1958   2 Sheets-Sheet 1
Fig. 1.
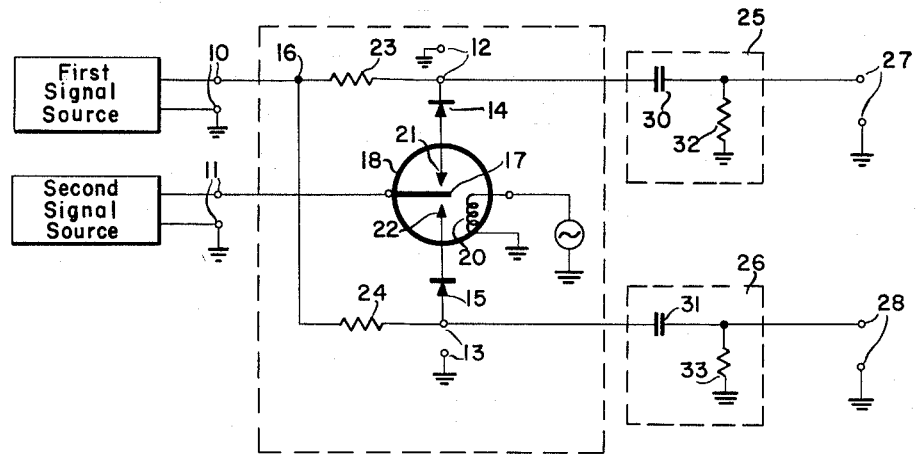
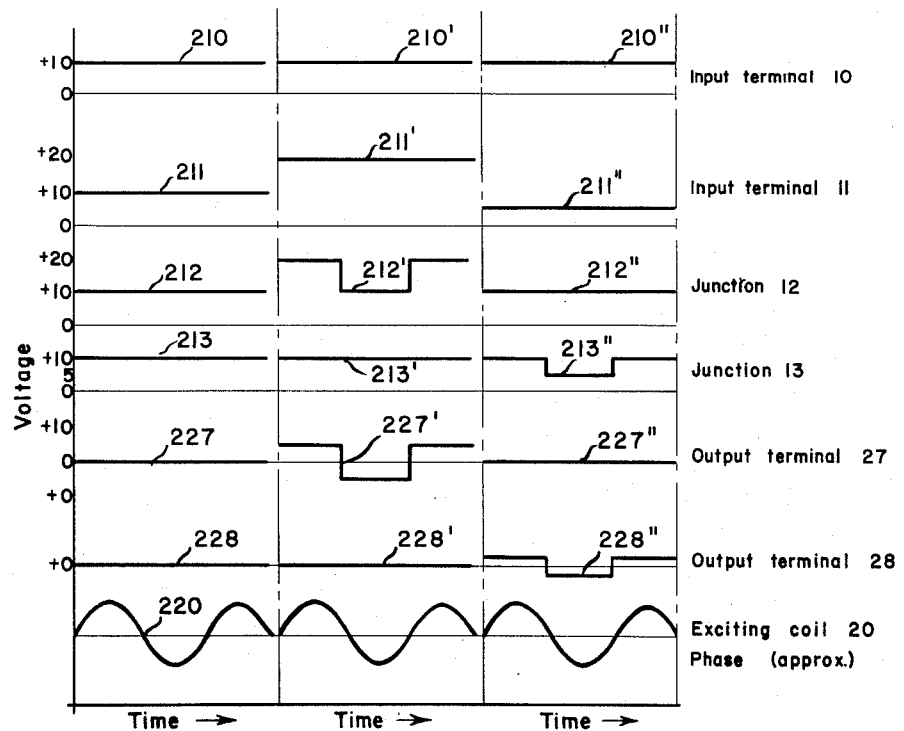
Fig. 2.
James N. Edwards,
INVENTOR.
BY.
Noel B. Hammond
AGENT.

Nov. 28, 1961      J. N. EDWARDS      3,011,071
ELECTRO-MECHANICAL DIFFERENTIAL-VOLTAGE DETECTOR
Filed July 1, 1958      2 Sheets-Sheet 2

James N. Edwards,
*INVENTOR.*

BY

*Noel B. Hammond*

AGENT.

December 28, 1961

United States Patent Office 3,011,071
Patented Nov. 28, 1961

3,011,071
ELECTRO-MECHANICAL DIFFERENTIAL-VOLTAGE DETECTOR
James N. Edwards, Los Angeles, Calif., assignor to Hughes Aircraft Company, Culver City, Calif., a corporation of Delaware
Filed July 1, 1958, Ser. No. 746,052
10 Claims. (Cl. 307—88.5)

The present invention relates to differential-voltage detectors, and more particularly to apparatus for indicating the relative amplitude difference and relative polarity of two signals.

Heretofore, there have been proposed a number of circuits for receiving two input signals and producing an output signal which is proportional to the voltage differential between the signals. Ordinarily, such circuits have included an electro-mechanical switch or chopper. When the output information is to include an indication of the sense or polarity of the voltage differential, a number of switching operations has been necessary. This usually required the provision of either a plurality of switch arms on a single chopper, or a plurality of choppers in the circuit. Such arrangements result in apparatus which is large and bulky, and requires critical adjustment.

In applicant's Patent 2,728,866, entitled "Electro-Mechanical Voltage Differential Detector," there is disclosed a voltage differential detector utilizing a single chopper having only one switch arm. While admirably suited for many purposes, the circuit of applicant's patent is not suitable for use under certain conditions. For instance, the circuit of Patent 2,728,866 provides a D.C. (direct current) output voltage at one output terminal which may be at either one of two voltage levels. That is, one of two output terminals will be at a potential determined by either of the two input signals, whichever is more positive with respect to the other. It is sometimes desirable to have the quiescent voltage level at both output terminals determined by a single one of the input signals. Such may be the case in direct-coupled circuits or in circuits for establishing the biasing potential of an electron tube or transistor.

In applicant's second patent on related devices, Patent 2,837,665, entitled "Electro-Mechanical Voltage Differential Detector," there is disclosed another voltage differential detector. While the circuit of applicant's second patent is also well suited for the applications for which it was developed, it too is not suitable for use under certain conditions. To be specific, in the circuit of Patent 2,837,665 the input signals are coupled to the output terminals through series diodes having a variable resistance under some conditions. Under some circumstances, for example, when voltage amplitude is being measured accurately, it is desirable to have the input signal coupled to the output terminals through elements having a constant impedance.

Accordingly, it is an object of the present invention to provide a differential-voltage detector having quiescent voltage levels at the output terminals which are determined by the voltage level of a single predetermined input signal.

Another object of the invention is the provision of a differential-voltage detector in which one input signal is coupled to the output terminals solely by means of elements having a constant impedance.

In accordance with the invention, there is provided a differential-voltage detector having first and second input terminals for receiving first and second input signals, respectively. The first input terminal is coupled to first and second output terminals solely by means of first and second resistors, thus providing coupling having a constant impedance under all operating conditions. The second input terminal is adapted to be coupled to the output terminals by means of an electro-mechanical switch and first and second diodes. Thus, the quiescent voltage levels at the output terminals are determined by the voltage level of the first input signal.

For a better understanding of the invention together with other and further objects thereof, reference is made to the following description taken in connection with the accompanying drawings in which embodiments of the invention are illustrated by way of example only, like reference characters designating like parts throughout the figures thereof, and wherein:

FIG. 1 is a circuit diagram of an embodiment of the differential voltage detector of the present invention;

FIG. 2 is a diagram of wave forms of signals appearing in the circuit of FIG. 1 in operation.

Figure 3:
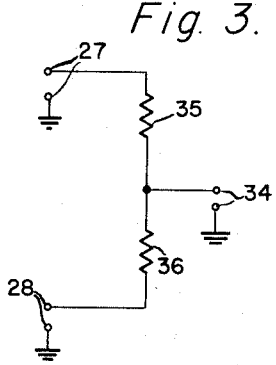
FIGS. 3 to 7 are circuit diagrams of various embodiments of output circuits which may be found useful in conjunction with the differential voltage detector shown in FIG. 1.

Referring now to FIG. 1 of the drawings, there is illustrated an electro-mechanical differential-voltage detector, in accordance with the invention, having first and second input terminals 10 and 11. To the first and second input terminals 10 and 11 are connected first and second signal sources, respectively, indicated schematically by rectangles. The first and second signal sources apply first and second signals to the input terminals 10 and 11. The first and second signals may be positive D.C. voltages, negative D.C. voltages or A.C. (alternating current) voltages, or any combination thereof.

The first input terminal 10 has two isolating resistors 23, 24 connected to it at junction point 16. To the other ends of resistors 23 and 24 are connected first and second diodes 14, 15, respectively. The cathode of diode 14 is joined to the other end of resistor 23 at terminal 12, while the anode of diode 15 is connected to the other end of resistor 24 at terminal 13.

The remaining ends of diodes 14 and 15 are connected to fixed contact points 21 and 22, respectively, of an electro-mechanical switch, or chopper, generally indicated at 18. The electro-mechanical switch 18 has a driving coil 20 energized by a source of alternating current, as indicated, having a suitable amplitude and frequency. Switch or movable arm 17 is arranged to alternately contact fixed contact points 21 and 22, respectively, as the arm vibrates in synchronism with the current through coil 20. The second input terminal 11 is connected to the switch arm 17.

Terminals 12 and 13 at the junctions of resistor 23 and diode 14, and resistor 24 and diode 15, respectively, may be regarded as the output terminals of the circuit when the direct coupling features of the present circuit are utilized. However, should it be unnecessary or undesirable to use direct coupling in some circumstances A.C. coupling networks 25 and 26 may be utilized. Coupling network 25 comprises a coupling capacitor 30 connected to D.C. output terminal 12, the other end of which is connected to an A.C. output terminal 27. A resistor 32 is connected from the output terminal 27 to ground. Similarly, coupling network 26 includes a capacitor 31 connected from D.C. output terminal 13 to A.C. output terminal 28, and a resistor 33 connected from the output terminal 28 to ground.

Referring now to FIG. 2, there is shown a diagram of waveforms of signals which may appear, for example, in the circuit of FIG. 1 when in operation. The voltage amplitude of each signal is indicated as the ordinate, while time is depicted as the abscissa. Each waveform has a number corresponding to the reference number of the point at which the signal appears in the circuit of FIG. 1 preceded by the numeral 2. The waveforms of FIG. 2 are illustrative of those which might appear in the circuit of FIG. 1 when the resistance of resistors 32 and 33 is greater than the resistance of resistors 23 and 24 and the resistance of the diodes 14 and 15. For purposes of illustration, it will be assumed that an alternating voltage numbered 220 in FIG. 2 having an appropriate frequency and amplitude is applied to coil 20, and that the first input signal applied to input terminal 10 from the first signal source is a D.C. voltage 10 volts positive with respect to ground and numbered 210. The second input signal applied to input terminal 11 from the second signal source is also assumed to be a D.C. voltage 10 volts positive with respect to ground and numbered 211.

The response of the circuit of FIG. 1 to the first and second input signals 210 and 211 when driving coil 20 is energized will now be considered. When arm 17 engages contact 21, the first signal 210 will appear at terminal 12 as output signal 212 because diode 14 has substantially equal voltages applied to its anode and cathode and presents, therefore, substantially an open circuit. Signal 210 will also appear at terminal 13 as output signal 213. When arm 17 moves from contact 21 to contact 22, terminals 12 and 13 will remain at the 10 volt potential of signal 210 since diode 15 will now be substantially an open circuit. Resistors 23 and 24 are included to isolate the signal sources, as required. It will thus be seen that the output signals 212 and 213 appearing at terminals 12 and 13 will be substantially the same as the first input signal 210. Thus, the appearance of identical signals at the output terminals 12 and 13 indicates that there is no voltage differential between the two input signals applied at terminals 10 and 11.

Considering now FIG. 2 at a later time, input signal 210' will be assumed to remain at 10 volts positive with respect to ground, while input signal 211' is increased to 20 volts positive with respect to ground. When switch arm 17 contacts switch contact 21, diode 14 will be biased in the forward or conducting direction and signal 211' will appear at terminal 12 as signal 212', while signal 210' will appear at terminal 13 as signal 213'. When arm 17 moves from contact 21 to contact 22, diode 15 will be biased in the reverse or nonconducting direction and signal 210' will appear at both terminals 12 and 13. Thus, the output signal 212' at terminal 12 will vary from a potential of 20 volts to 10 volts positive with respect to ground, while output signal 213' at terminal 13 will remain at a potential of 10 volts positive with respect to ground. Thus, the appearance of a varying voltage at terminal 12 indicates that there is a voltage differential between the input signals 210' and 211', and that input signal 211' is positive with respect to input signal 210'. The magnitude of the voltage differential is indicated by the extent of the variation of output signal 212'.

FIG. 2 will now be considered at a yet later time when, as before, the first input signal 210" is 10 volts positive with respect to ground, the second input signal 211" is now assumed to be 5 volts positive with respect to ground. When arm 17 engages contact 21, diode 14 is biased in the reverse or nonconducting direction and signal 210" appears at terminals 12 and 13. When arm 17 moves from contact 21 to contact 22, diode 15 is biased in a forward or conducting direction and the 5 volt potential from terminal 11 appears at terminal 13 while point 12 remains at a 10 volt potential. Thus, the appearance of a varying signal 213" at terminal 13 indicates that there is a voltage differential between the signals applied at the input terminals 10 and 11, and that the signal 210" at input terminal 10 is positive with respect to the input signal 211" at input terminal 11. The amount of the voltage differential is proportional to the amount of amplitude variation of output signal 213".

Thus it will be seen that if a voltage differential exists between the input signals applied at terminals 10 and 11, there will appear at one of the output terminals 12 or 13 a varying voltage whose amplitude of variation is proportional to the amount of voltage differential of the input signals. Further, if the varying voltage appears at terminal 12, then it will be known that the input signal at terminal 11 is positive with respect to the signal at terminal 10, and vice versa. In all cases, the output terminal 12 or 13 at which the varying output signal does not appear will have a voltage substantially equal to that at input terminal 10. The varying output signal on the other output terminal 12 or 13 will vary from a quiescent voltage or amplitude level substantially equal to that at input terminal 10. Because solely resistive elements couple the first input terminal 10 to the output terminals 12 and 13, the same proportionality factor will always exist between the signal at terminal 10 and the quiescent voltage at the output terminals 12 and 13, regardless of the amplitude of the input signals.

It will be obvious that the signals appearing at points 12 and 13 may be applied directly to utilization circuits. This would be the case when advantage is to be taken of the direct coupling between input terminal 10 and the output terminals 12 and 13, as for establishing the bias level of an electron tube. However, it is sometimes convenient or necessary to have the direct current component of the output signal eliminated. In such cases, A.C. coupling networks 25 and 26 may be used. When networks 25 and 26 are used, and a varying potential is present at terminal 12, the signal will be applied through the network 25 and appear at output terminal 27 as a varying potential of the same amplitude varying about zero voltage with respect to ground. When a varying signal appears at terminal 13 it will be applied through network 26 to output terminal 28 as a signal of the same amplitude as signal 213" but varying about ground. It will be understood by those skilled in the art that a constant D.C. potential appearing at terminals 12 or 13 will be blocked by capacitors 30 or 31 and will not appear at output terminals 27 and 28. It will be apparent, therefore, that the appearance of an output signal at one or the other of output terminals 27 and 28 is an indication of the relative polarity of the applied input signals. The amplitude of the output signal appearing at the output terminals 27 or 28 will be proportional to the difference of potential between the two input signals. In FIG. 2, waveforms 227, 227' or 227" and 228, 228' and 228" illustrate the signals appearing at output terminals 27 and 28 after passing through the coupling networks 25 and 26 for the conditions assumed in the examples illustrated.

An obvious modification of the circuit of FIG. 1 would be to reverse the direction of conduction of diodes 14 and 15, that is, connect the anode of diode 14 to point 12, and to connect the cathode of diode 15 to point 13. Such a reversal will merely result in an interchange of the conditions of relative polarity between input signals which cause output signals to be produced at a particular one of the output terminals 27 and 28.

Referring now to FIG. 3, if it is considered advantageous to have the output signal always appear at a single output terminal, this may be accomplished by providing two mixing or summing resistors 35 and 36 connected in series between output terminals 27 and 28. At the junction of the two resistors 35 and 36 a single output terminal 34 may be provided. With such an arrangement, a varying signal appearing at either output terminal 27 or 28 will also appear at terminal 34. Thus, the signal at output terminal 34 will indicate that there is a voltage differential between the first and second input signals 210 and 211 and the amplitude of the signal appearing at terminal 34 will be proportional to the amplitude of the voltage differential. However, the signal appearing at terminal 34 will not indicate the relative polarity of the input signals 210, 211 or 210', 211', etc.

Figure 4:
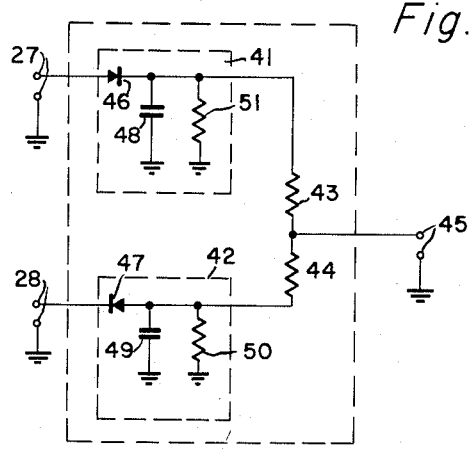

In FIG. 4 is illustrated an output circuit which may be useful when there is need for a single output terminal at which a D.C. output signal will be developed whose amplitude is proportional to the voltage differential of the input signals applied to terminals 10 and 11 and whose polarity is indicative of which of the input signals has the greater amplitude. Two rectifying and filtering circuits indicated by dotted rectangles 41 and 42 are coupled to output terminals 27 and 28, respectively. Rectifying circuit 41 may comprise a diode 46 connected to terminal 27. To the other side of the diode 46, a filter capacitor 48 is connected, the remaining end of which is connected to ground. In parallel with capacitor 48 is connected a resistor 51. Similarly, circuit 42 includes a diode 47 connected to terminal 28 and a capacitor 49 and resistor 50 connected from the other side of the diode to ground. A first mixing resistor 43 is connected to the first rectifying circuit 41 at the junction of the diode 46, capacitor 48 and resistor 51. A second mixing resistor 44 is connected to circuit 42 at the corresponding junction. The remaining ends of the mixing resistors 43 and 44 are joined and connected to an output terminal 45. The diodes 46 and 47 are poled oppositely with respect to each other in order that the polarity of the signal appearing at terminal 45 will indicate which of the terminals 27 or 28 developed the varying signal. It will be understood that although the output signal at terminal 45 is shown in FIG. 4 as being taken with respect to ground, the output signal may be taken with respect to any suitable voltage level in this or the following A.C. coupling circuits.

Figure 5:
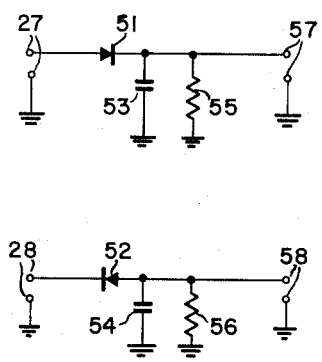

FIG. 5 illustrates a circuit which may be used to rectify output signals appearing at terminals 27 and 28 for applying them to two individual direct current output terminals 57 and 58. The anode of a diode 51 is connected to terminal 27 and the cathode of the diode 51 is connected to terminal 57. From terminal 57 to ground may be connected a filter capacitor 53 and a load resistor 55 in parallel. Similarly, the cathode of a diode 52 may be connected to terminal 28, the anode being connected to terminal 58, and a filter capacitor 54 and load resistor 56 connected from terminal 58 to ground. The diodes 51 and 52 may be poled oppositely with respect to each other. Thus, if a varying A.C. signal appears at terminal 27, a relatively constant D.C. signal of one polarity will appear at terminal 57, while if an A.C. signal appears at terminal 28, a relatively constant D.C. signal of the opposite polarity will appear at terminal 58. It will be observed that these output signals differ from those developed at terminals 12 and 13 in that the latter are pulsating D.C. or square waves.

Figure 6:
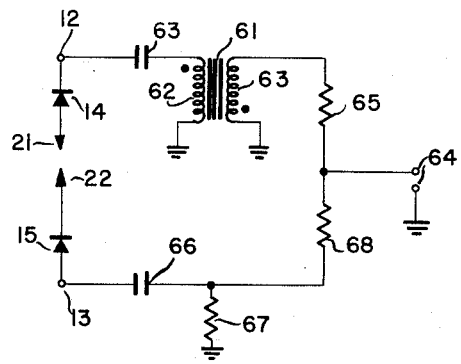

In some cases, it may be of utility to provide a single pair of output terminals for producing a single A.C. output signal whose phase is indicative of the relative polarity of the input signals. FIG. 6 illustrates an output circuit which includes means for reversing the phase of the signal appearing at one of the terminals 12 or 13 and a summing circuit for summing this phase-converted signal and the signal appearing at the remaining terminal, 12 or 13. A phase reversing transformer 61 has one end of its primary winding 62 connected to contact 21 by means of a coupling capacitor 63, the remaining end of the primary winding 62 being grounded. One side of the secondary winding 63 of the transformer 61 is also grounded, while the remaining end of the secondary winding 63 is connected to an output terminal 64 through a summing resistor 65. The dots adjacent the primary winding 62 and secondary winding 63 in FIG. 6 devote the relative phase of the windings. It will be observed that the transformer 61 is connected in a manner which reverses the phase of the signal. The signal appearing at point 13 is coupled to the output terminal 64 by means of a series connected capacitor 66 and resistor 68. A resistor 67 is connected between the junction point of capacitor 66 and resistor 68 and ground. Output signals from this circuit may be taken between output terminal 64 and ground. Where input signal conditions are such that an alternating current output signal appears at only one of points 12 or 13, the phase relationship between the signal appearing on the output terminal 64 and the alternating current signal driving electromechanical switch 18 will be indicative of the relative polarity of the input signals. The phase may be compared in any of the well-known types of phase comparison circuit (not shown) or by means of an oscilloscope. Similarly, the amplitude of the output signal appearing at the output terminal 64 will be indicative of the relative amplitudes of the input signals.

Figure 7:
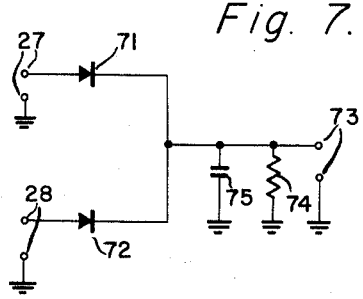

If it should be advantageous to provide a single D.C. output signal whose amplitude is proportional to the relative amplitude of the input signals without reference to the relative polarities of the signals, use may be made of the output circuit shown in FIG. 7. The circuit of FIG. 7 includes a pair of similarly poled diodes 71 and 72 for interconnecting output terminals 27 and 28, and a single output terminal 73. The rectified output signal appearing at the terminal 73 may be smoothed by means of a filter network comprising a resistor 74 and a capacitor 75, each being connected between the output terminal 73 and ground. Output signals from the network may be taken between the terminal 73 and ground.

Thus, there has been described a differential voltage detector which produces an output signal indicative of the difference in amplitude and relative polarity of two input signals having solely stable and constant impedance elements coupling one of the signal sources to the output terminals, and in which the quiescent voltage appearing at the output terminals is determined by the voltage applied at a predetermined one of the input terminals.

What is claimed is:

1. Signal comparison apparatus comprising first and second input terminals, a pair of output terminals, a constant impedance path coupling said first input terminal to each of said output terminals, whereby a reference potential is developed at said output terminals in response to a signal applied to said first input terminal which is proportional thereto, a pair of unilaterally conducting devices each individually coupled to a different one of said output terminals, said devices being poled oppositely, and means coupled between said second input terminal and said devices for switching said second input terminal alternately from one of said devices to the other of said devices, whereby an output signal is developed at a predetermined one of said output terminals in response to a difference of potential between input signals applied to said input terminals, said predetermined one of said output terminals at which said output signal is developed being determined by the relative polarity of said input signals.

2. Apparatus for comparing first and second input signals to provide an indication of the relative potential difference and relative polarity of said input signals, comprising first and second input terminals responsive to first and second input signals to be compared, a pair of output terminals, a constant impedance path coupling said first input terminal individually to each of said output terminals, a pair of asymmetrically conducting devices each individually coupled to a different one of said output terminals, said devices being oppositely poled, and means coupled to said second input terminal and to said devices for connecting said second input terminal sequentially to said devices, whereby a quiescent potential level with respect to a fixed potential is developed at said output terminals in response to said first input signal, and whereby an output signal deviating from said level appears at a predetermined one of said output terminals in response to differences in potential between said input signals.

3. A signal comparison circuit comprising first and second input terminals for receiving first and second input signals to be compared, first and second output terminals at which output signals may be developed, a first constant resistive impedance path coupling said first input terminal to said first output terminal, a second constant resistive impedance path coupling said first input terminal to said second output terminal, a first unilaterally conducting device coupled to said first output terminal, a second unilaterally conducting device coupled to said second output terminal, said devices being oppositely poled with respect to each other, and a switch coupled to said devices and to said second input terminal for alternately and cyclically connecting said second input terminal to said devices, whereby an output signal is developed at one of said output terminals indicative of the relative potential of said input terminals in response to operation of said switch.

4. The circuit of claim 3 which additionally includes third and fourth output terminals, a first blocking capacitor coupled between said first and third output terminals, a second blocking capacitor coupled between said second and fourth output terminals, and a pair of resistors individually coupling said third and fourth output terminals to a point of fixed potential.

5. The circuit of claim 4 which additionally includes a fifth output terminal, and a pair of summing resistors individually coupling said third and fourth output terminals to said fifth output terminal.

6. The circuit of claim 4 which additionally includes a fifth output terminal, a first rectifier coupled to said third output terminal, a second rectifier coupled to said fourth output terminal, said rectifiers being poled oppositely, a pair of smoothing filters individually coupled between the other sides of said rectifiers and a point of fixed potential, and a pair of summing resistors individually coupling said smoothing filters to said fifth output terminal.

7. The circuit of claim 4 which additionally includes fifth and sixth output terminals, a third unilaterally conducting device coupled between said third and fifth output terminals, a fourth unilaterally conducting device coupled between said fourth and sixth output terminals, said devices being oppositely poled and a pair of smoothing filters individually coupled between said fifth and sixth output terminals and a point of fixed potential.

8. An electro-mechanical differential-voltage detector comprising first and second input terminals, first and second output terminals, a first resistor connected between said first input terminal and said first output terminal, a second resistor connected between said first input terminal and said second output terminal, an electro-mechanical switch having a movable arm and first and second stationary contacts, said movable arm being operable to alternately engage said first and second contacts, said movable arm being connected to said second input terminal, a first diode connected between said first contact and said first output terminal, and a second diode connected between said second contact and said second output terminal, said diodes being poled oppositely with respect to each other.

9. An electro-mechanical differential-voltage detector comprising first and second input terminals, first and second output terminals, a first resistive impedance element connected between said first input terminal and said first output terminal, a second resistive impedance element connected between said first input terminal and said second output terminal, an electro-mechanical switch having a movable arm and first and second stationary contacts, means coupled to said switch for causing cyclical movement of said arm into alternate engagement with said first and second contacts, said movable arm being connected to said second input terminal, a first unilaterally conducting device connected between said first contact and said first output terminal, and a second unilaterally conducting device connected between said second contact and said second output terminal, said devices being oppositely poled.

10. Signal comparison apparatus comprising first and second input terminals, a pair of output terminals, a constant impedance path coupling said first input terminal to each of said output terminals, a pair of unilaterally conducting devices each individually coupled to a different one of said output terminals, said devices being poled oppositely, means coupled between said second input terminal and said devices for switching said second input terminal alternately from one of said devices to the other of said devices, and output circuit means coupled to said output terminals.

References Cited in the file of this patent
UNITED STATES PATENTS

| | | |
|---|---|---|
| 2,817,772 | Lee | Dec. 24, 1957 |
| 2,829,251 | Patton | Apr. 1, 1958 |
| 2,861,200 | Henle et al. | Nov. 18, 1958 |
| 2,864,961 | Lohman et al. | Dec. 16, 1958 |
| 2,866,103 | Blake et al. | Dec. 23, 1958 |
| 2,889,517 | Ehret | June 2, 1959 |
| 2,900,534 | Chater | Aug. 18, 1959 |